United States Patent
Guo et al.

(10) Patent No.: US 6,683,766 B1
(45) Date of Patent: Jan. 27, 2004

(54) DC ARC DETECTION AND PREVENTION CIRCUIT AND METHOD

(75) Inventors: Sam Yonghong Guo, Canton, MI (US); James L. Jones, III, White Lake, MI (US); Ansel Strickland Dooley, Wyandotte, MI (US)

(73) Assignee: Yazaki North-America, Inc., Canton, MI (US)

( * ) Notice: Subject to any disclaimer, the term of this patent is extended or adjusted under 35 U.S.C. 154(b) by 64 days.

(21) Appl. No.: 10/073,700

(22) Filed: Feb. 11, 2002

(51) Int. Cl.[7] ................................. H02H 9/08
(52) U.S. Cl. .......................................... 361/42; 361/97
(58) Field of Search ........................ 361/42, 87, 79, 361/88, 111, 94, 97; 324/500, 509, 536, 522

(56) References Cited

U.S. PATENT DOCUMENTS

| | | |
|---|---|---|
| 5,121,282 A | 6/1992 | White |
| 5,280,404 A | 1/1994 | Ragsdale |
| 5,619,105 A | 4/1997 | Holmquest |
| 5,629,824 A * | 5/1997 | Rankin et al. ............... 361/57 |
| 5,835,319 A | 11/1998 | Welles, II et al. |
| 5,905,619 A | 5/1999 | Jha |
| 5,963,406 A | 10/1999 | Neiger et al. |
| 6,115,230 A | 9/2000 | Voigts et al. |
| 6,229,679 B1 | 5/2001 | Macbeth |

FOREIGN PATENT DOCUMENTS

JP      60-44226    *   3/1985

* cited by examiner

*Primary Examiner*—Shawn Riley
(74) *Attorney, Agent, or Firm*—Rader, Fishman & Grauer PLLC

(57) ABSTRACT

A circuit and method are disclosed for detecting an imminent arc prior to the ignition of the arc in a system having a DC power supply that provides power to a load through a conductor. The inventive circuit includes a current-change detector that detects a sudden drop in current through the conductor that is indicative of an imminent arc. Upon detection of a sudden drop in current through the conductor, a multivibrator generates a pulsed signal, wherein the width of the pulse is indicative of a determined period of time for which the power supply should be disconnected to prevent ignition of an arc. The pulsed signal controls a transistor, which selectively disconnects the power supply from the load for a determined period of time in response to the pulsed signal.

28 Claims, 2 Drawing Sheets

DC ARC DETECTION AND PREVENTION CIRCUIT AND METHOD

FIELD OF THE INVENTION

The present invention relates generally to the art of electrical arc detection and prevention, and, more specifically, to a system and method for detecting and preventing imminent DC arcs based upon a pre-arc condition.

BACKGROUND OF THE INVENTION

Electrical arcs comprise a significant source of potential fires and component damage in many different environments that employ electrical power. Electrical arcs generally occur when an electrical connector is disconnected thereby creating an air gap between the two sides of the electrical connector. At the beginning of the disconnection, the separation distance between the two sides of the connector is very small. As a result, the voltage across the air gap produces a very large electrical field in terms of volts per millimeter. This large electrical field causes the ignition of an electrical arc between the two sides of the connector.

Various methods are known to detect electrical arcs in Alternating Current (AC) systems. However, it is much more difficult to prevent an electrical arc in a Direct Current (DC) system because DC currents do not have zero-crossing moments, which are used to detect arcs in AC systems.

DC systems are employed in a variety of environments, including, for example, electrical systems of automotive vehicles. Traditionally, electrical systems in automotive vehicles have been based on a 12-volt power supply. It has been determined by the inventors that DC arcs generally do not persist unless the voltage across the air gap is at least 14 volts. Thus, arcs in traditional 12-volt automotive electrical systems have traditionally been relatively uncommon and/or less severe. However, a current developmental trend in automotive vehicles is to incorporate electrical systems having power supplies larger than the traditional 12 volts. A relatively common modern automotive electrical system includes a 42-volt power supply, and some vehicles, such as electric vehicles, may incorporate even higher voltage power supplies. The inventors hereof have recognized that these modem automotive electrical systems pose a much greater risk of igniting an electrical arc when an air gap is created by a connector being disconnected. Further, because DC arcs ignite at current levels lower than normal load currents and at voltage levels below the power supply output, common over-current or over-voltage protection devices (such as fuses, breakers, etc.) will not function to detect or prevent an arc. Thus, the inventors have recognized that there is a need for a new system for detecting and preventing electrical arcs in DC systems.

SUMMARY OF THE INVENTION

The present invention is directed to a system and method of detecting the imminent ignition of a DC arc prior to the actual arc ignition itself. The present invention detects an "arc precursor condition" that is indicative of an imminent arc ignition.

The inventors have recognized that the DC current and DC voltage across an electrical connector during a disconnection are not, as has been commonly believed in the industry, mere noise signals. Rather, the DC current and DC voltage signals across an air gap follow a particular pattern during a disconnection and prior to the ignition of an electrical arc across the two sides of the connector. According to one specific aspect of the invention, either the DC current or DC voltage across the air gap comprise the arc precursor condition that is used to detect an imminent arc ignition. According to a further specific aspect of the present invention, a sudden drop in the DC current across the connector is detected and considered indicative of an imminent arc ignition.

Other aspects and advantages of the present invention will become apparent to those skilled in the art in light of the detailed description and claims of this application.

DETAILED DESCRIPTION OF A PREFERRED EMBODIMENT OF THE INVENTION

Figure 1:
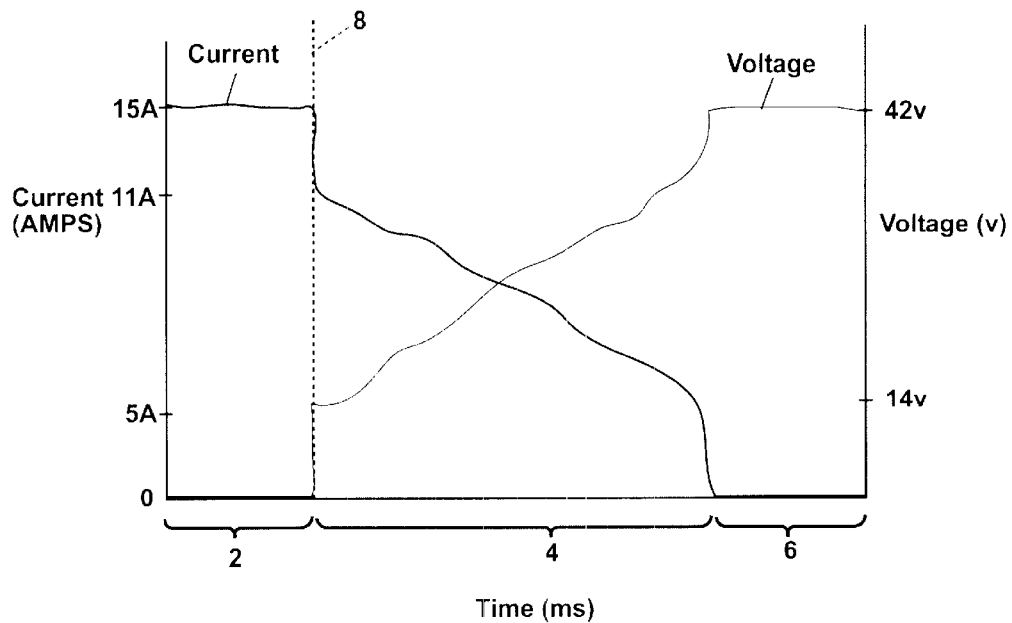
FIG. 1 is a graphical illustration of an exemplary pattern of DC current and DC voltage across a connector during a disconnection.

The present invention is directed to a system and method for detecting a DC arc prior to ignition of the arc. An "arc precursor condition" is detected that is indicative of an imminent arc ignition. The inventors have recognized that DC current and DC voltage across an air gap created by a break in an electrical circuit (such as across a disconnected connector) follow a particular pattern prior to the ignition of an arc. An exemplary representation of this pattern is illustrated in FIG. 1, which illustrates the behavior of a 42-volt DC electrical system for use in connection with a modern automotive vehicle. As shown in FIG. 1, fifteen (15) amps of DC current normally flow from a 42-volt power supply in such a system. The full fifteen (15) amps flow across the electrical connector, and there is no voltage drop across the connector (time period 2). Time point 8 in FIG. 1 represents the beginning of the break in the electrical connection, i.e., the disconnection of the electrical connector. At the beginning of the disconnection 8, i.e., when the contacts of the connector begin to separate, the inventors have recognized that the DC current suddenly drops to approximately eleven (11) amps, and the DC voltage suddenly increases to approximately fourteen (14) volts. This relatively small voltage produces a very large electrical field because of the small air gap between the two sides of the connector. The very large electrical field causes air molecules in the air gap to become ionized. However, the DC arc does not commence immediately. Rather, the ionized air molecules must accumulate and achieve an elevated temperature before they actually become conducting. The inventors have identified this period of time between the sudden drop in current (and sudden increase in voltage) across the connector and the point in time when there is ignition of an arc as an "arc precursor time." The arc precursor time generally only lasts on the order of tens of microseconds.

Still referring to FIG. 1, after the beginning of the disconnection (at point 8), the DC current gradually declines as the two parts of the connector are further separated, as shown in time period 4. Similarly, during time period 4, the DC voltage gradually increases as the air gap widens. At some point, the air gap becomes large enough such that the electrical field strength created by the voltage across the open circuit (the disconnected connector) is no longer sufficient to maintain the arc. At that point, the arc is extinguished and the DC current drops to zero. This is illustrated in time period 6 of FIG. 1.

Figure 2:
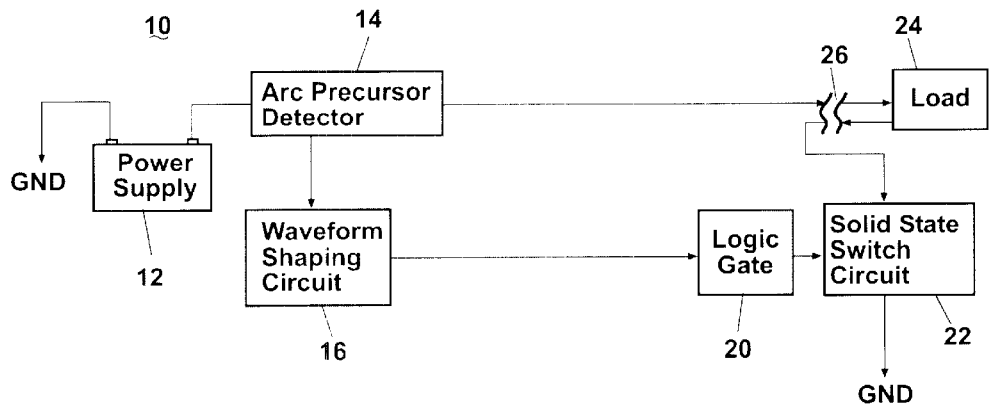
FIG. 2 is a block diagram of a DC system incorporating an arc precursor detector according to an embodiment of the invention.

FIG. 2 is a block diagram that illustrates an embodiment of the invention that detects an imminent arc before it ignites. FIG. 2 also illustrates other features of an embodiment of the invention, including preventing the arc from ultimately igniting by disconnecting the power supply in response to detecting an imminent arc. Referring to FIG. 2, the inventive electrical system 10 includes a conventional power supply circuit 12 that powers the electrical system 10. The power supply circuit 12 is electrically connected to an arc precursor detector 14. The arc precursor detector 14 is connected to an electrical connector 26, which functions to connect the load 24 to the rest of the electrical system 10. The arc precursor detector 14 provides an arc precursor control signal to a waveform shaping circuit 16. The waveform shaping circuit 16 outputs a turn-off pulse in response to the control signal from the arc precursor detector 14. The turn-off pulse is provided to a logic gate 20, the output of which controls a solid-state switch 22. While the turn-off pulse is active, the solid-state switch 22 opens the circuit between the power supply 12 and the load 24, effectively turning the power supply circuit 12 off for a period of time defined by the width of the turn-off pulse. While not necessary, it is possible to include a microcontroller or other counter device (not shown) in the system, which can be used to count the number of times an arc precursor condition is detected, and, if that number exceeds a certain reference value, the power supply circuit 12 can be turned off indefinitely.

Figure 3:
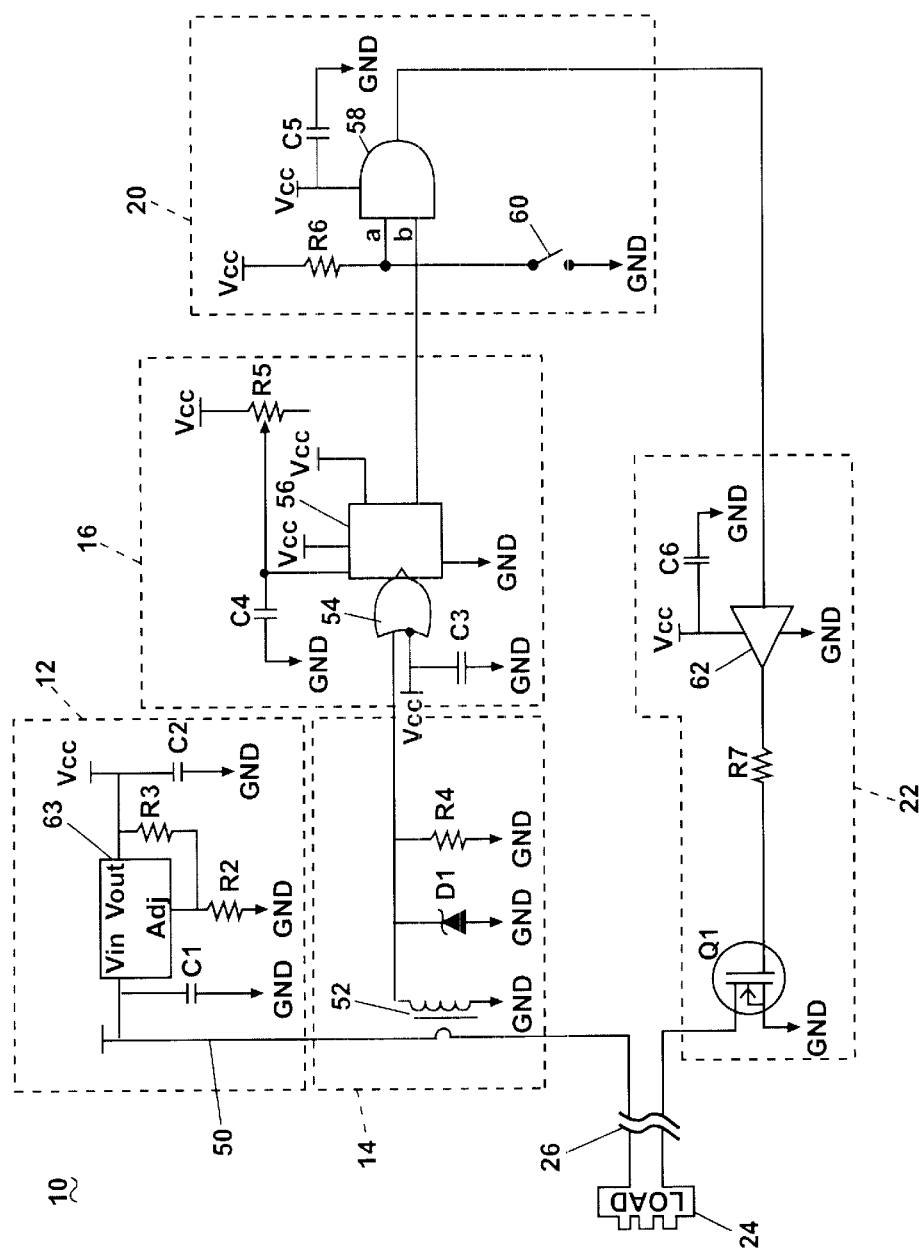
FIG. 3 is a circuit diagram that illustrates additional detail of the DC system in FIG. 2, including an arc precursor detector according to an embodiment of the invention.

FIG. 3 is a detailed circuit diagram that illustrates the embodiment of the invention set forth in FIG. 2 in more detail, wherein the components that make up each of the blocks in FIG. 2 are shown. Common reference numbers in FIGS. 2 and 3 refer to the same component or block in the respective figures. Referring to FIG. 3, the load 24 is connected to the electrical system 10 through connector 26. Power supply circuit 12 supplies power to the load 24 across main conductor 50 through arc precursor detector circuit 14. The power supply circuit 12 comprises a linear regulator 63, capacitors C1 and C2, and resistors R2 and R3, which are arranged in a standard fashion so as to regulate the main power supply (not shown) from a high voltage (such as 42 volts) to a low voltage Vcc (such as 12 volts) to power the remaining components in the system 10.

The arc precursor detector circuit 14 comprises a toroidal inductor 52, Zener diode D1, and resistor R4. The toroidal inductor 52 acts as the central component of the arc precursor detector circuit 14 for detecting an imminent arc. The main conductor 50 passes through the center hole of the toroidal inductor 52 in arc precursor detector circuit 14. When a disconnection of connector 26 is initiated, the current through main conductor 50 suddenly drops, as explained above. The sudden drop in current in the main conductor 50 causes a short voltage pulse to be induced in toroidal inductor 52. This short voltage pulse is indicative of an imminent arc ignition, and it is referred to as an arc precursor control signal. Resistor R4 provides a path to ground for the induced voltage pulse cased by the drop in current in the main conductor 50. Zener Diode D1 provides protection for the wave shaping circuit 16 in the event that the induced voltage is too high.

The arc precursor control signal is provided to the wave shaping circuit 16. The wave shaping circuit 16 includes a monostable multivibrator 56, which outputs a turn-off pulse at the rising edge of a trigger signal. The pulse width of the turn-off pulse represents the length of time that the power supply circuit 12 will be disconnected from the load 24. The turn-off pulse width is controlled by the R-C circuit comprised of C4 and R5. Preferably, C4 is sized at 100 nF and R5 is an adjustable resistor so as to facilitate adjustment of the turn-off pulse width through the multivibrator 56. The pulse width can be set to any length that is functional to prevent arc ignition. The inventors have determined that if the turn-off pulse width is too short, the power supply circuit 12 will be reconnected to the load 24 before the air gap between the two sides of the connector 26 is sufficiently big to avoid arc ignition, in which case, an arc would ignite. Further, it is preferable to limit the length of the turn-off pulse width so that the load is not without power for an unnecessarily long period of time. Accordingly, the inventors have determined that the turn-off pulse width is preferably between 3 ms and 200 ms and most preferably approximately 100 ms. The wave shaping circuit also preferably includes capacitor C3, which is a power by-pass capacitor.

The turn-off pulse is provided to a logic gate circuit 20. The logic gate circuit 20 includes an AND logic gate 58. One input (b) to the AND gate 58 is the turn-off pulse from wave shaping circuit 16, and the other input (a) to the AND gate 58 is controlled by a manual switch 60. The manual switch 60 allows a user to manually control the connection of the power supply 12 and the load 24 through the electrical circuit 10. When the manual switch 60 is open, the AND gate input (a) is high, and when the manual switch 60 is closed, the AND gate input (a) is low. When a turnoff pulse (i.e., a low signal) is provided to AND gate 58, the output of AND gate 58 is low. Logic gate circuit 20 also preferably includes resistor R6 and capacitor C5. Resistor R6 is a pull-up resistor, which provides a high logic level at point (a) when the manual switch 60 is open. Capacitor C5 is a power supply by-pass capacitor.

The output of the AND gate 58 is provided to solid-state switch circuit 22, which controls the connection and disconnection of the power supply circuit 12 in response to the output of AND gate 58. The solid-state switch circuit 22 includes a MOSFET driver 62, capacitor C6, resistor R7, and transistor Q1. The transistor Q1 acts as a solid-state switching device. Because the arc precursor time period is very short (on the order of tens of microseconds), the inventors have determined that it is preferable to use a solid-state switch. However, fast mechanical relays or circuit breakers can also be used. Transistor Q1 is controlled by the output of MOSFET driver 62. Thus, when the output of AND gate 58 is high, transistor Q1 is "on", thus causing the power supply 12 to be connected to the load 24. On the other hand, when the output of AND gate 58 is low, transistor Q1 is "off", thus disconnecting the power supply 12 form the load 24. Preferably, transistor Q1 is a MOSFET component. Solid-state switch circuit 22 also preferably includes resistor R7 and capacitor C6. Resistor R7 is used to improve EMC performance of MOSFET driver 62. Capacitor C6 is a power supply by-pass capacitor.

While the present invention have been described above in connection with a particular preferred embodiment, one of ordinary skill in the art will recognize the invention can be implemented in a variety of different embodiments while remaining within the scope of the invention. For example, the toroidal coil of the arc precursor detector 14 could be replaced with various other components that provide a control signal in response to a change in voltage or current, such as any type of transformer (i.e., iron core, ferrite core, air core, PC trace, etc.). Similarly, the monostable multivibrator 56 in the wave shaping circuit 16 could be replaced with various components capable of activating immediately in response to a trigger and deactivating after a delayed time, such as a timer, a counter, a flip-flop, a latch, a PLD device, and an FPGA device. Sometimes, it is desired that after an arc precursor is detected, the power to the load is shut off until a manual reset or a microprocessor reset turns the circuit back on. In this case, a flip-flop or a latch is preferred. Further, the AND gate 58 could be replaced by virtually any type of logic gate or similar device, such as a NAND gate, an OR gate, a NOR gate, a PLD device and an FPGA device. Additionally, the MOSFET transistor Q1 in the solid-state switch circuit 22 could be replaced with a variety of switching devices, such as an IGBT transistor, a BJT transistor, a thyristor, a GTO, an MCT, a Smart High-Side Switch, a Smart Low-Side Switch, and a fast mechanical relay. Furthermore, the entire system can take several different forms, such as individual components (as described above) or as an integrated chip. The invention hereof may also be incorporated with other known protection circuitry, such as over-current protection, over-voltage protection, under-voltage protection, reverse-battery protection, thermal protection, etc. Therefore, the following claims should be studied to understand the scope of the present invention.

We claim:

1. An arc detector circuit in a system having a DC power supply connected to a load by a conductor, comprising an arc precursor detector for detecting an arc precursor condition indicative of an imminent arc, wherein said arc precursor condition comprises at least one of the following: (i) a change in current in said conductor; and (ii) a change in voltage drop at the location of the imminent arc.

2. The arc detector circuit of claim 1, wherein said change in current comprises a drop in current level in said conductor.

3. The arc detector circuit of claim 1, wherein said arc precursor detector is a current-change detector that provides an arc precursor control signal, and wherein said arc detector circuit of claim 1 further comprises a means for controlling the power supply in response to said arc precursor control signal.

4. The arc detector circuit of claim 3, wherein said current-change detector is a toroidal coil.

5. The arc detection circuit of claim 3, wherein said current-change detector is a transformer.

6. The arc detector circuit of claim 3, wherein said means for controlling the power supply includes a switch that selectively disconnects the power supply from the load.

7. The arc detector circuit of claim 6, wherein said switch comprises a solid-state device.

8. The arc detector circuit of claim 7, wherein said solid-state device is a transistor.

9. The arc detector circuit of claim 7, wherein said solid-state device is a thyristor.

10. The arc detector circuit of claim 7, wherein said solid-state device is an intelligent switch.

11. The arc detector circuit of claim 6, wherein said means for controlling the power supply further includes a means for causing said switch to disconnect the power supply from the load for a determined period of time.

12. An arc detector circuit in a system having a DC power supply connected to a load by a conductor, comprising:
an arc precursor detector for detecting an arc precursor condition indicative of an imminent arc and providing an arc precursor control signal; and
means for controlling the power supply in response to said arc precursor control signal, said means including a switch for disconnecting the power supply from the load for a determined period of time,
wherein said means for controlling the power supply includes a device that provides a pulsed signal to said switch, wherein a width of said pulsed signal is indicative of said determined period of time.

13. The arc detector circuit of claim 12, wherein said device for providing a pulsed signal comprises a multivibrator.

14. The arc detector circuit of claim 12, wherein said device for providing a pulsed signal comprises a latch.

15. The arc detector circuit of claim 12, wherein said device for providing a pulsed signal comprises a flip-flop.

16. The arc detector circuit of claim 12, wherein said width of said pulsed signal is based upon an R-C circuit.

17. The arc detector circuit of claim 12, further comprising a logic gate that receives said pulsed signal and outputs a control signal to said switch based upon said pulsed signal.

18. An arc prevention circuit in a system having a DC power supply connected to a load by a conductor, comprising:
a current-change detector for detecting a change in current passing through the conductor that is indicative of an imminent arc and providing an arc precursor control signal in response thereto;
a signal generator circuit that generates a turn-off signal in response to said arc precursor control signal; and
a switch that selectively disconnects the power supply from the load in response to said turn-off signal.

19. The arc prevention circuit of claim 18, wherein said switch is a solid-state device.

20. The arc prevention circuit of claim 19, wherein said solid-state device is a transistor.

21. The arc prevention circuit of claim 18, wherein said turn-off signal is a pulsed signal.

22. A method of detecting an imminent arc in a system having a DC power supply connected to a load by a conductor, comprising the step of detecting an arc precursor condition that is indicative of an imminent arc, wherein said arc precursor condition comprises at least one of the following: (i) a change in current in said conductor; and (ii) a change in voltage drop at the location of the imminent arc.

23. The method of claim 22, wherein said step of detecting a change in an arc precursor condition comprises detecting a drop in current passing through the conductor.

24. The method of claim 22, further comprising the step of selectively disconnecting the power supply from the load based upon the detection of an imminent arc.

25. The method of claim 24, wherein said step of selectively disconnecting the power supply comprises disconnecting the power supply for a determined period of time; and reconnecting the power supply after the expiration of said determined period of time.

26. The method of claim 24, wherein said step of selectively disconnecting the power supply comprises disconnecting the power supply until a reset occurs.

27. The method of claim 24, wherein said step of selectively disconnecting the power supply comprises controlling a solid-state switching device.

28. The method of claim 27, wherein said step of selectively disconnecting the power supply further comprises the step of generating a pulsed signal that controls said solid-state switching device.

* * * * *